Dec. 6, 1927.　　　　　　　　　　　　　　　1,652,156
C. J. R. BEAUCHAMP
STOPPER FOR VACUUM FLASKS AND OTHER CONTAINERS
Filed Oct. 27, 1924

Patented Dec. 6, 1927.

1,652,156

UNITED STATES PATENT OFFICE.

CLIFFORD JAMES RUDOLPH BEAUCHAMP, OF LONDON, ENGLAND.

STOPPER FOR VACUUM FLASKS AND OTHER CONTAINERS.

Application filed October 27, 1924, Serial No. 746,145, and in Great Britain November 2, 1923.

This invention relates to stoppers for vacuum flasks or other containers adapted to contain beverages.

Cork and other stoppers as now ordinarily used impart an unpleasant flavour to the contents of the container if confined for any substantial period as is usual with vacuum flasks.

I have found that this defect can be cured if the surface of the stopper exposed to the liquid in the container is made of dental rubber, vulcanite or equivalent material rendered hard and impermeable by heat treatment.

The invention may therefore be said to consist broadly of a stopper, for vacuum flasks and other containers, having a resilient surface where it comes into contact with the mouth of the flask or container and provided at the end which is exposed to the contents of the flask or container, with a surface composed of dental rubber vulcanite or equivalent material rendered hard and impermeable by heat treatment such latter surface being integral with the resilient surface of the stopper.

The present invention must not be confused with rubber covered cork or other stoppers as although in some cases the rubber or vulcanite covering employed has been applied by a vulcanization process the degree of hardness and impermeability necessary in the present invention cannot be attained without rendering the stopper incapable of acting as an efficient seal.

In order that the invention may be clearly understood several embodiments of the same will now be described, by way of example, by aid of the accompanying drawings in which:—

Figure 1:
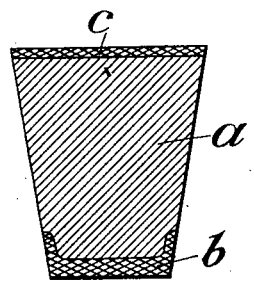
Fig. 1 is a vertical section through a stopper according to one embodiment of the invention.

The stopper according to the embodiment illustrated in Fig. 1 consists of a body $a$ composed of ordinary soft or resilient rubber composition and a protective coating $b$ of vulcanite or dental rubber over the lower surface which is normally exposed to the liquid.

The provision of the impermeable top layer $c$ is optional and is used only for the purpose of providing a surface which will take a good impression from a die.

Figure 2:
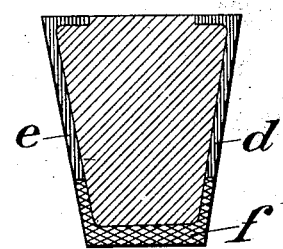
Fig. 2 is a similar view of another embodiment.

In the embodiment illustrated in Fig. 2 $d$ represents a core which may be of metal preferably aluminium the major surface of which is covered with a layer $e$ of resilient material which for ease in manufacture may consist of soft dental rubber or vulcanite, in which case the impermeable coating $f$ at the lower end can be formed by a vulcanization process. If desired the core $d$ may be composed of soft rubber composition as in the first described example in which case the coatings or layers $e$ and $f$ may both be made impermeable the necessary resiliency being then afforded by the core $d$.

Figure 3:
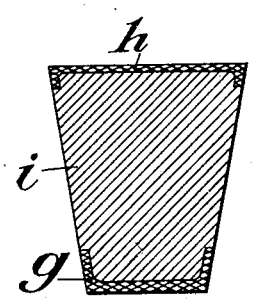
Fig. 3 is a similar view of a still further embodiment.

In Fig. 3 is illustrated a stopper composed wholly of rubber or vulcanite, the impermeable coating $g$ being formed by heat treatment. A top coating $h$ may be similarly formed.

Figure 4:
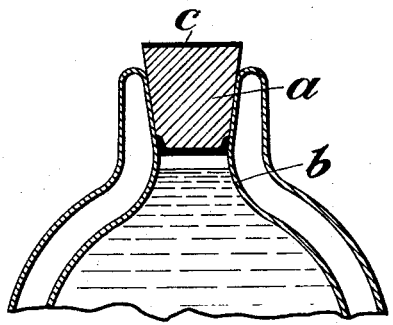
Fig. 4 is a fragmentary section of a container neck with a stopper in position showing how the impermeable material covers the whole surface of the stopper which is normally exposed to the liquid in the container.

In this example the main body $i$ of the stopper is left soft so as to enable it to yield when inserted in the mouth of the container as shown in Fig. 4.

What is claimed is:—

1. A stopper of the class described, having a side surface of soft rubber and a surface of vulcanized rubber at its inner end integral with said soft rubber surface.

2. A stopper of the class described, composed of soft rubber and provided at the inner end with a surface of vulcanized rubber integral with said soft rubber.

CLIFFORD JAMES RUDOLPH BEAUCHAMP.